June 10, 1941.    B. C. LANSDALE    2,244,717
ELECTRICAL NETWORK
Filed Dec. 4, 1939

INVENTOR:
BENJAMIN C. LANSDALE
BY
ATTORNEY.

Patented June 10, 1941

2,244,717

UNITED STATES PATENT OFFICE 2,244,717

ELECTRICAL NETWORK

Benjamin C. Lansdale, San Francisco, Calif., assignor to Echlin Manufacturing Company, San Francisco, Calif., a corporation of California Application December 4, 1939, Serial No. 307,488

7 Claims. (Cl. 177—311)

This invention relates to improvements in electrical networks and more particularly to networks in which an element in a main circuit is employed to control the operation of an element in a subordinate circuit and is a continuation in part of my co-pending application Serial No. 253,516, filed January 30, 1939. The invention may be incorporated in electrical tachometers (as illustrated, for example, in my Patent No. 2,221,591) and "cam angle" meters for the automotive art by connecting a metering subcircuit to the ignition system of the motor, whereby the performance of various motor parts may be tested while the motor is in normal operation. The invention is susceptible of other applications which will be apparent to those skilled in the electrical arts.

Among the objects of the invention is to obviate any appreciable interchange of potential between the main circuit and the subordinate circuit connected thereto and to minimize the effect of the subordinate circuit upon the reactivity characteristics of the main circuit.

Another object is to render the working potential in the subordinate circuit substantially independent of variations in the potential of the main circuit. This is particularly important in test apparatus such as automotive performance gauges to be used in conjunction with a plurality of ignition systems of differing potential which would otherwise affect the accuracy of the test readings. Furthermore, the voltage of a given ignition system will vary with the charging rate of the generator which obviously is dependent upon the speed of the motor. Heretofore such potential variations rendered inaccurate the test readings of performance gauges which were calibrated with respect to an assumed constant voltage in the ignition system.

Another object is to eliminate from the subordinate circuit alternations or incidental oscillations of potential occurring in the main circuit.

Other objects and advantages appear as the description progresses.

In this specification and the accompanying drawing, the invention is illustrated in certain preferred forms. It is to be understood, however, that it is not limited to these forms because it may be embodied in other forms within the purview of the claims following the description.

Figure 1:
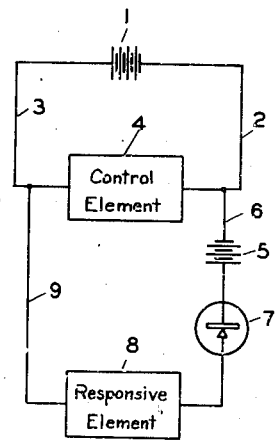
Fig. 1 is a schematic wiring diagram of the present invention in an electrical network, the main circuit of which is substantially non-reactive.

In detail, the system illustrated in Fig. 1 comprises a main circuit which includes a source of direct current potential, such as the battery 1, and the conductors 2 and 3 connecting the battery 1 in series to the control element 4 which may be a periodic circuit breaker or any electrical element having a variable potential drop thereacross. For convenience, the main circuit is merely schematically illustrated. It may include other functional elements not shown and it may be a mesh in a more complicated network. The use of the simplified form of the invention illustrated in Fig. 1 requires, however, that no appreciable potential oscillations be impressed on the element 4.

The subordinate circuit comprises the battery 5 connected to one side of the control element 4 by the conductor 6. The battery 5 may have a lower potential than the battery 1 and is arranged counter to this battery. Thus reverse flow of current under the potential of the battery 5 through the battery 1 is blocked by the opposed potential of the battery 1. The subordinate circuit is completed through the unidirectional resistor 7, the responsive element 8, and the conductor 9 leading back to the opposite side of the control element 4.

The unidirectional resistor 7 is arranged to present relatively low resistance to the flow of current through the subordinate circuit under the potential of the battery 5 while substantially preventing the flow of current in the reverse direction under the higher potential of the battery 1. The responsive element 8 has impressed thereon only the potential of the battery 5 as modified by the variable impedance of the control element 4. The operation of the element 8 in response to changes in the impedance of the control element 4 is thus substantially unaffected by variations in the potential at 1. The responsive element 8 may be an electrical gauge, inductive coupling, or any other electrical apparatus whose operation it is desired to control by means of the element 4.

Figure 2:
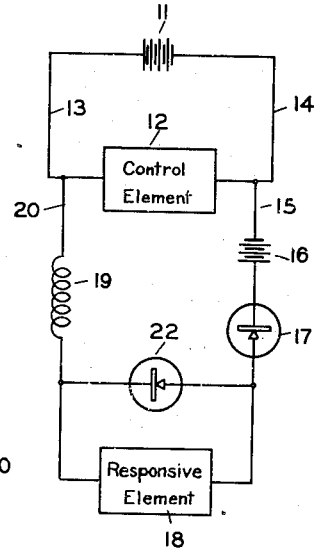
Fig. 2 is a similar diagram of a form of the invention preferred where the main circuit is subject to alternations, incidental oscillations, or surges.

Fig. 2 illustrates another embodiment of the invention for use in instances where the potential in the main circuit is subject to incidental oscillations or pulsations. The main circuit schematically shown in Fig. 2 includes the source 11 of direct current which is connected in series with the control element 12 by the conductors 13 and 14. The potential oscillations or pulsations in the main circuit may be set up by an interrupter cooperating with inductive and capacitive reactors in the circuit by a telephone transmitter or by other means well known in the art.

The subordinate circuit comprises, in series, the conductor 15 connected to one side of the control element 12, the battery 16, the unidirectional resistor 17, the responsive element 18, the inductive reactor 19, and the conductor 20 leading back to the opposite side of the control element 12 to complete the circuit. The battery 16 and the unidirectional resistor 17 are arranged to resist the reverse flow of current through the subordinate circuit similarly to the corresponding elements in Fig. 1. The battery 16 has a lower potential than the current source 11 so that reverse flow of current under the potential of the battery 16 is blocked by the higher potential of the source 11. The unidirectional resistor 22 is shunted across the responsive element 18 and is arranged to provide a low resistance path for any reverse flow of current passed by the battery 16 and the first unidirectional resistor 17, thus diverting this current from the responsive element 18. The unidirectional resistor 22 presents relatively high resistance to current flowing in the normal direction. The inductive reactor 19 has an inductance such that the incidental or transient potential oscillations and pulsations occurring in the main circuit will be materially damped in the subordinate circuit. It has been found in practice that the unidirectional resistor 17, especially if it be of the copper oxide type, cooperates with the inductive reactor 19 to eliminate the potential oscillations substantially completely from the subordinate circuit so that the operation of the responsive element 18 is unaffected by transient potential oscillations in the main circuit. The damping action of the unidirectional resistor 17 is not clearly understood, but it may possibly be due to an inherent capacitive effect.

Figure 3:
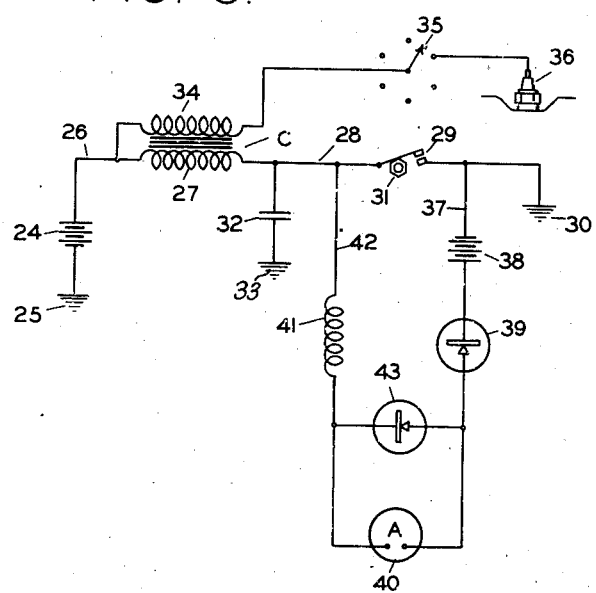
Fig. 3 is a wiring diagram of a practical form of the present invention incorporated in a "cam angle" meter for the automotive art.

In Fig. 3 the invention is incorporated in a "cam angle" meter for the automotive trade as an example of a specific practical use of the present invention. Such meters are utilized to determine the fractional ratio of the time that the breaker contacts in the ignition system are closed with respect to the completed cycle of their operation. In the use of this apparatus it is highly desirable that the readings of the meter be unaffected by a variation in the voltage of the battery and generator and by differences in the voltages of the batteries in the various ignition systems to be tested, or by fluctuations in the voltage of a given ignition system during the testing operation. It is likewise important that the operating characteristics of the ignition system be substantially unaffected by the application of the testing apparatus to the system. The present invention constitutes a simple means for attaining these objects.

The conventional ignition system comprises an input circuit including, in series, the usual storage battery 24 with one of its poles grounded at 25 and its opposite pole connected by the conductor 26 to the primary 27 of the coil C. The input circuit is completed by the conductor 28 connected to the opposite side of the primary 27 and leading through the breaker contacts 29 to the ground at 30. These contacts are located in the usual distributor and are intermittently opened by the cam 31 in synchronism with the operation of the motor. The condenser 32 is interposed between the conductor 28 and the ground 33 and coacts with the inductive reactor 27 to set up high frequency oscillations each time contact at 29 is broken.

The output of the ignition system includes the secondary 34 of the coil C which may be connected to the conductor 26 or otherwise grounded. The usual rotor 35 of the distributor is connected to the opposite terminal of the secondary 34 and successfully completes the circuit through each of a plurality of grounded spark plugs, such as 36. The oscillations in the input circuit set up by the reactors 27 and 32 upon the breaking of the contacts 29 induces a high potential in the secondary 34 to generate a spark at 36 in the manner well known in the art.

The subordinate metering circuit is essentially similar to the subordinate circuit shown in Fig. 2. It comprises, in series, the conductor 37 connected to one terminal of the breaker contacts 29, the battery 38 arranged counter to the potential of the battery 24, the unidirectional resistor 39, the ammeter 40, the choke coil 41, and the conductor 42, completing the circuit to the opposite terminal of the breaker contacts 29. The unidirectional resistor 43 is shunted across the ammeter 40. The unidirectional resistors 39 and 43 are arranged similarly to the corresponding elements in Fig. 2 hereinbefore described.

In operation, each time the contacts 29 are closed a direct current potential wave is impressed on the ammeter 40. Since these waves occur too rapidly for the ammeter to respond to them individually, it will give a reading proportional to the average current. This average current will be in substantially linear proportion to the fraction of the time that the switch 29 remains closed with respect to its total cycle of operation, thus enabling the meter to give a reading indicating this time fraction.

The choke coil 41, and the unidirectional resistors 39 and 43 interact to suppress in the subordinate circuit the transient oscillations in the ignition system, in a manner similar to that hereinbefore described in connection with Fig. 2. The reading of the ammeter 40 is dependent only upon the voltage of the battery 38 which is a substantially constant factor and upon the relative fraction of the time that the contacts 29 are closed with respect to their completed cycle of operation. The ammeter reading is consequently independent of the varying voltages of the batteries 24 in the ignition systems tested. Since interchange of current between the ignition system and the subordinate circuit is prevented as hereinbefore described, the metering circuit imposes no current drain on the ignition system and retains the operating characteristics of the ignition system substantially unchanged.

Having thus described this invention, what I claim and desire to secure by Letters Patent is:

1. An electrical network comprising a main circuit including a source of direct current potential and a control element having periodic breaker means, and a subordinate circuit including, in series, said control element, a source of direct current, a unidirectional resistor, and an element responsive to current flow from said second source as modified by the action of said control element; said source of current and said unidirectional resistor being arranged to oppose the reverse flow of current through said responsive element under the potential of said source in the main circuit.

2. An electrical network comprising a main circuit including a source of direct current potential and a control element having periodic breaker means, and a subordinate circuit including, in series, said control element, a source of direct current, a unidirectional resistor, and an element responsive to current flow from said second source as modified by the action of said control element, said source of current and said unidirectional resistor being arranged to oppose the reverse flow of current through said responsive element under the potential of said source in said main circuit, and said current source in said subordinate circuit being of no greater potential than said source in said main circuit so that the reverse flow of current in said main circuit under the potential of said current source in said subordinate circuit is blocked by the potential of the source in said main circuit.

3. An electrical network including a source of direct current potential and a control element having periodic breaker means, and a subordinate circuit including, in series, said control element, a source of direct current, a unidirectional resistor, and an element responsive to current flow from said second source as modified by the action of said control element, said source of current and said unidirectional resistor being arranged to oppose the reverse flow of current through said responsive element under the potential of said source in said main circuit, and a second unidirectional resistor shunted across said responsive element and arranged to provide a by-pass path for any reverse flow of current passed by said first unidirectional resistor and said current source in said subordinate circuit.

4. An electrical network comprising a main circuit including a source of direct potential and a control element having periodic breaker means, and a subordinate circuit including, in series, said control element, a source of direct current, a unidirectional resistor, an element responsive to current flow from said second source as modified by the action of said control element, and an inductive reactor having an inductance such that any incidental potential oscillations occurring in said main circuit will be damped in said subordinate circuit, said source of current in said subordinate circuit and said unidirectional resistor being arranged to oppose the reverse flow of current through said responsive element under the potential of said source in said main circuit.

5. Means for measuring the dwell of the periodic breaker means of an ignition system having a source of current and an induction coil primary in series with said breaker means, comprising a circuit connected across said breaker means to be closed and opened thereby, said circuit including in series a source of current, a rectifier, and a current responsive element, the rectifier having such a polarity that when said breaker means are closed current from said second source is applied to said element through minimum resistance.

6. Means for measuring the dwell of the periodic breaker means of an ignition system having a source of current and an induction coil primary in series with said breaker means, comprising a circuit connected across said breaker means to be closed and opened thereby, said circuit including in series a source of current, a rectifier, and a current responsive element, the rectifier having such a polarity that when said breaker means are closed current from said second source is applied to said element through minimum resistance, and the polarity of said second source being opposed to and no greater than that of the first source.

7. Means for measuring the dwell of the periodic breaker means of an ignition system having a source of current and an induction coil primary in series with said means, comprising a circuit connected across said breaker means to be closed and opened thereby, said circuit including in series a source of direct current, a unidirectional resistor, and an element responsive to current flow from said second source as controlled by said breaker means, said second source of current and said unidirectional resistor being arranged to oppose the reverse flow of current through said responsive element under the potential of the current source of the ignition system.

BENJAMIN C. LANSDALE.